(No Model.)
F. JONES.
STOVE.
No. 523,666.    Patented July 31, 1894.
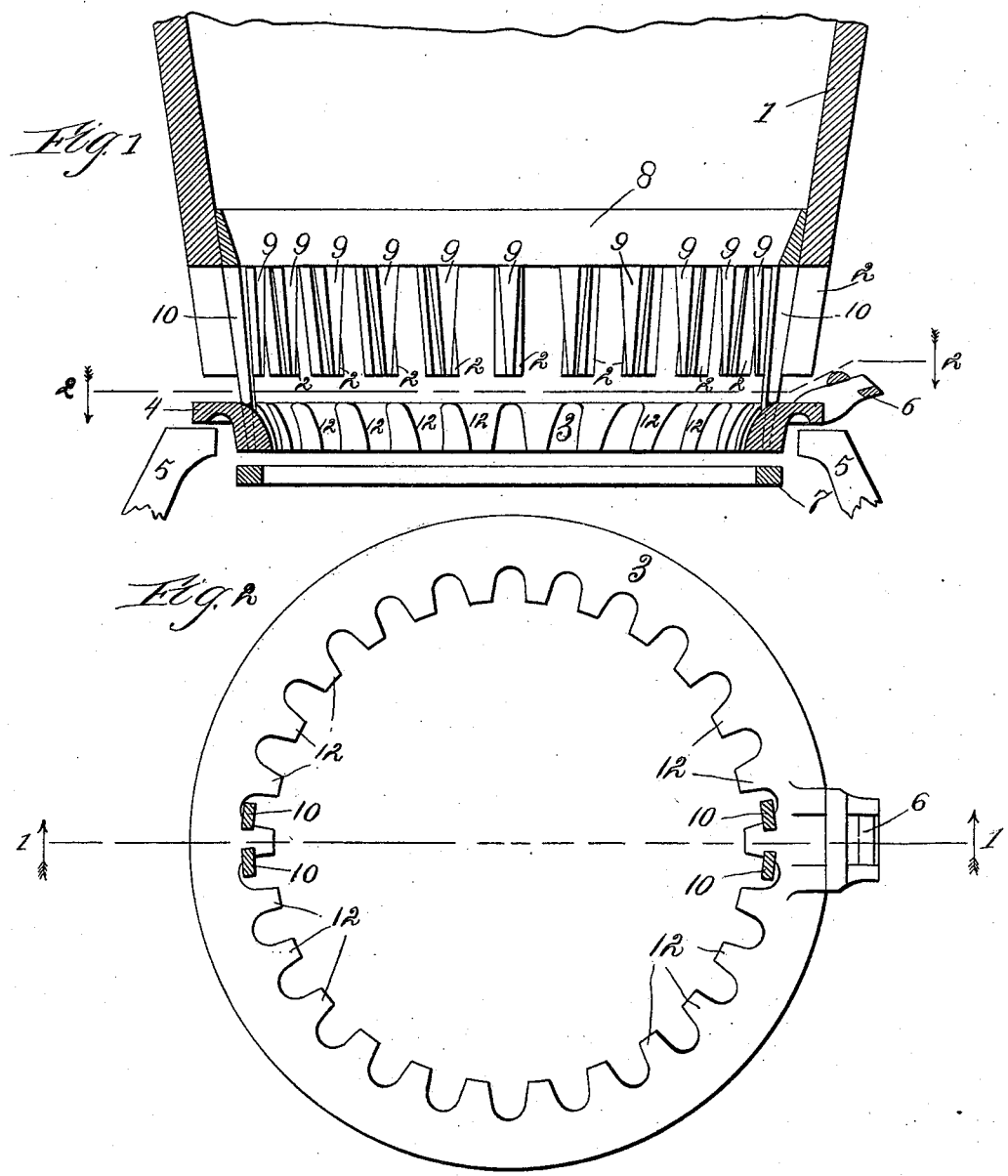
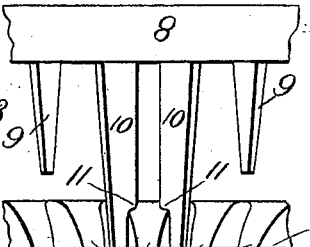
Witnesses:
Nellie McKibben
Julia M. Bristol
Inventor:
Frank Jones

UNITED STATES PATENT OFFICE.

FRANK JONES, OF CHICAGO, ILLINOIS, ASSIGNOR TO HIMSELF AND GEORGE H. JENKINS, OF SAME PLACE.

STOVE.

SPECIFICATION forming part of Letters Patent No. 523,666, dated July 31, 1894.

Application filed August 21, 1893. Serial No. 483,694. (No model.)

*To all whom it may concern:*

Be it known that I, FRANK JONES, a citizen of the United States, residing at Chicago, in the county of Cook and State of Illinois, have invented certain new and useful Improvements in Stoves, of which the following is a specification, reference being had to the accompanying drawings, in which—

Figure 1 is a central vertical section of the fire pot of a stove showing my improvements, being a section on line 1—1 of Fig. 2. Fig. 2 is a plan view of the rotary grate, being a horizontal section on line 2—2 of Fig. 1; and Fig. 3 is an enlarged detail showing the method of connecting the rotary grate and the rotary fire pot.

My invention relates to stoves, and has for its object to provide improved devices for shaking out ashes, cinders, &c.

My improvements are particularly intended for use with base burning stoves, but they may be applied to any other stoves for which they are adapted.

I accomplish the object of my invention as hereinafter specified and as illustrated in the drawings.

That which I regard as new will be pointed out in the claims.

In the drawings,—1 indicates a stationary fire pot, which is supported fixedly in any suitable manner. The interior surface of the fire pot 1 is inclined, making it somewhat conical in shape, as shown in Fig. 1, and the fire pot is provided, around its lower edge, with downwardly extending fingers 2, as shown.

3 indicates a rotary grate, which is supported below the stationary fire pot 1 and is of about the same diameter as the lower portion of said fire pot. The grate 3 is provided with a peripheral flange 4 which is adapted to rest upon a support 5, as shown in Fig. 1, whereby the rotation of the grate 3 will be permitted. Instead of a support 5 any other suitable supporting device may be used.

6 indicates a bracket formed on or secured to the grate 3, in which bracket is provided a socket for the stove hook, by the use of which the grate 3 may be partially rotated.

7 indicates a grate, preferably what is commonly known as a "duplex" grate, which is located under the rotary grate 3. The grate 7, however, has nothing to do with my present invention, and need not be more fully described.

8 indicates a rotary fire pot which is circular in shape, and its exterior surface is conical and parallel with the interior surface of the stationary fire pot 1. The rotary fire pot 8 is provided around its under edge with a series of depending fingers 9, which are substantially equal in length with the fingers 2, and the size of the rotary fire pot 8 is such that when fitted into the stationary fire pot 1 the lower ends of the fingers 9 will be practically even with the lower ends of the fingers 2, as shown in Fig. 1. The teeth 2 of the stationary fire pot 1 and the teeth 9 of the rotary fire pot 8 are equal in number and are placed regularly around their respective fire pots, by which arrangement the spaces between the teeth of the two fire pots may be made to register with each other. By rotating the fire pot 8 its teeth 9 may be made to cross the spaces between the teeth 2 of the stationary fire pot, thereby serving to cut out any ashes or cinders which may lie in such spaces. When the spaces of the two fire pots register a poker may be used if desired.

For the purpose of rotating the rotary fire pot 8 it is provided at two diametrically opposite points with a pair of elongated fingers 10, as shown in Fig. 3, which fingers are provided with shoulders 11 which rest upon teeth or lugs 12 carried by the grate 3, as best shown in Figs. 2 and 3. The lower ends of the fingers 10 project into spaces between the lugs 12 of the grate 3, and the weight of the rotary fire pot 8 is thereby supported by the grate 3. By this construction, when the grate 3 is rotated the rotary fire pot 8 will also be rotated. The ashes and cinders will thereby be thoroughly agitated, the cinders and clinkers being broken up and permitted to work out from the fire pot.

That which I claim as my invention, and desire to secure by Letters Patent, is—

1. The combination with a stationary fire pot having an interior conical surface, of a rotary fire pot having an exterior conical surface adapted to the interior conical surface of the stationary fire pot, a rotary grate arranged under said fire pots, a support for said rotary grate, and arms or fingers rigidly connecting the rotary fire pot with the rotary grate so that they move in unison in the same direction, substantially as described.

2. The combination with a rotary fire pot, of a rotary grate having teeth or lugs 12, and fingers 10 depending from the rotary fire pot and having shoulders 11 resting on and embracing some of the said teeth or lugs, for connecting the rotary fire pot with the rotary grate and supporting the former from the latter, substantially as described.

3. The combination with a stationary fire pot having pendent fingers 2, of a rotary fire pot arranged within the stationary fire pot and having pendent fingers 10, a rotary fire grate having lugs or teeth 12 with which the lower ends of the said fingers engage to rigidly connect the rotary fire pot with the rotary grate, and a support for said rotary grate, substantially as described.

FRANK JONES.

Witnesses:
J. L. JACKSON,
A. H. ADAMS.